United States Patent
Chhabra et al.

(10) Patent No.: US 7,154,708 B2
(45) Date of Patent: Dec. 26, 2006

(54) THERMAL PROTRUSION REDUCTION IN MAGNET HEADS BY UTILIZING A HEAT-SPREADING PAD

(75) Inventors: Devendra S. Chhabra, San Jose, CA (US); Rod Lee, San Jose, CA (US); Glen Garfunkel, San Jose, CA (US); Mor Dovek, San Jose, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 12 days.

(21) Appl. No.: 11/172,173

(22) Filed: Jun. 30, 2005

(65) Prior Publication Data

US 2005/0237667 A1    Oct. 27, 2005

Related U.S. Application Data

(62) Division of application No. 09/970,788, filed on Oct. 5, 2001, now Pat. No. 6,928,721.

(51) Int. Cl.
G11B 5/60    (2006.01)

(52) U.S. Cl. .................................................. 360/234.5

(58) Field of Classification Search .................. None
See application file for complete search history.

(56) References Cited

U.S. PATENT DOCUMENTS

| | | | |
|---|---|---|---|
| 3,770,403 A | 11/1973 | Maries et al. | 65/43 |
| 5,757,590 A | 5/1998 | Phipps et al. | 360/113 |
| 5,936,811 A * | 8/1999 | Seagle | 360/322 |
| 6,103,136 A | 8/2000 | Han et al. | 216/22 |
| 6,130,863 A | 10/2000 | Wang et al. | 369/13 |
| 6,158,107 A | 12/2000 | Chang et al. | 29/603.14 |
| 6,452,740 B1 * | 9/2002 | Ghoshal | 360/97.02 |
| 6,597,544 B1 * | 7/2003 | Ghoshal | 360/317 |
| 6,614,623 B1 * | 9/2003 | Nakamura et al. | 360/244.1 |
| 6,639,757 B1 * | 10/2003 | Morley et al. | 360/245.9 |
| 6,813,118 B1 * | 11/2004 | Pust et al. | 360/234.5 |

* cited by examiner

Primary Examiner—R. S. Tupper
(74) Attorney, Agent, or Firm—Saile Ackerman LLC; Stephen B. Ackerman (57) ABSTRACT

A magnetic read/write head and slider assembly and method for forming said magnetic read/write head and slider assembly, wherein said assembly has improved heat spreading and dissipation properties and exhibits significantly reduced thermal protrusion during operation. The method of formation is simple and efficient, involving only the extension of one of the conductive mounting pads so that it is in thermal contact with a portion of the slider assembly surface that is over the read/write element.

10 Claims, 6 Drawing Sheets

TEMPERATURE PROFILE – SLIDER LENGTH DIRECTION

THERMAL PROTRUSION REDUCTION IN MAGNET HEADS BY UTILIZING A HEAT-SPREADING PAD

This is a division of patent application Ser. No. 09/970,788, filing date Oct. 5, 2001, now U.S. Pat. No. 6,928,721. Thermal Protrusion Reduction In Magnet Heads By Utilizing a Heat-Spreading Pad, assigned to the same assignee as the present invention, which is herein incorporated by reference in its entirety.

BACKGROUND OF THE INVENTION

1. Field of the Invention

This invention relates generally to the fabrication of merged magnetic read/write heads and slider assemblies and, more particularly, to the fabrication of such a head and slider assembly with improved heat spreading and dissipation characteristics to eliminate problems associated with thermal expansion and protrusion of head elements during operation.

2. Description of the Related Art

A merged magnetic read/write head and slider assembly consists essentially of a magnetoresistive read sensor element formed on the pole pieces of an inductively magnetized write element and mounted within, or fabricated as an integral part of, a slider assembly that physically and electrically connects the head to an actuator arm. The read/write head is subjected to complex thermal stresses during its normal operation due to the buildup of thermal energy from Joule heating in its read and write stages (sensing current in the read element and write current in the write coil). The heat dissipation properties of the read/write head are limited by the thermal conductivity of the protective overcoat material (typically sputtered alumina) that covers the head. Since alumina is a relatively poor conductor of heat, a temperature buildup occurs in both the head and the overcoat as the overcoat is unable to eliminate the heat produced in the head with sufficient rapidity.

Figure 1:
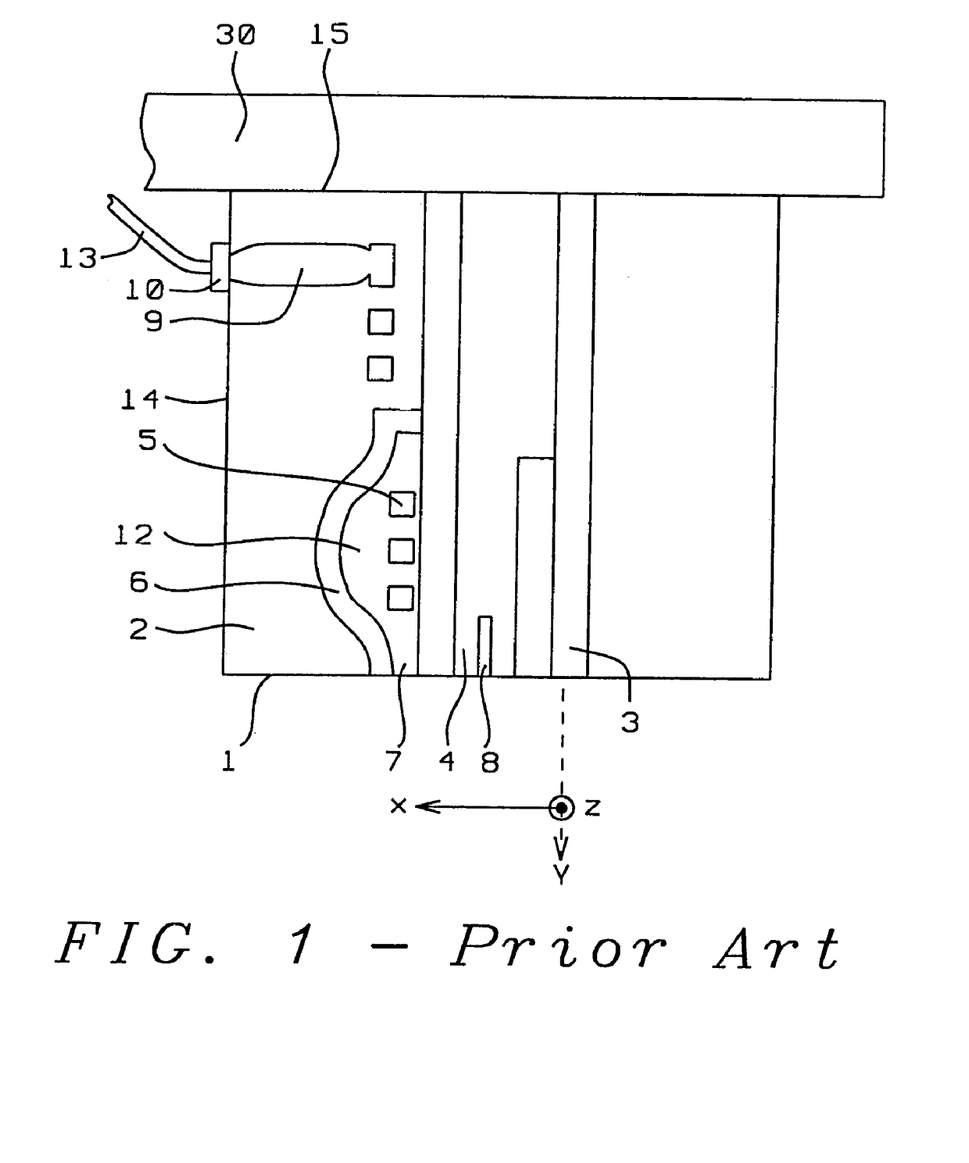
FIG. 1 is a schematic drawing of a cross-section of a magnetic read/write slider/head assembly that is representative of both the prior art and the present invention. For purposes of discussion, the plane of the cross-section is the x-y plane and x denotes the slider length direction.
Figure 2:
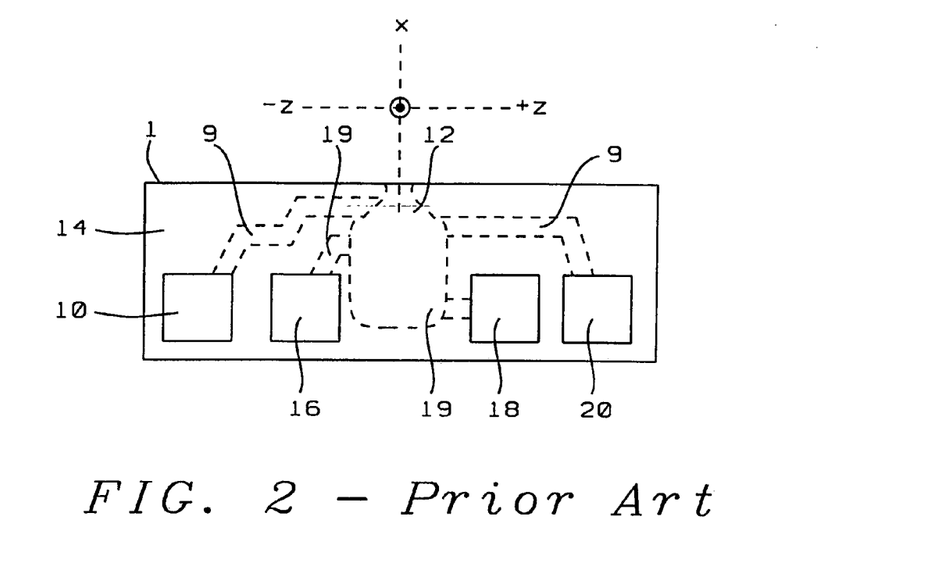
FIG. 2 is a schematic drawing of the top surface configuration (trailing end of the slider) of a read write head fabricated in accord with the prior art. The plane of this drawing is the y-z plane relative to the drawing of FIG. 1. The trailing end surface displayed represents the surface of attachment of the slider/head assembly to the external wires along the actuator arm assembly.

FIGS. 1 and 2 show two schematic views of a read/write head and slider assembly. FIG. 1 shows a cross-section of the head attached at (15) to the actuator arm (30). Details include the overcoat (2), the upper (6) and lower (4) pole-pieces and the insulation imbedded coil structure (5) that inductively activates them. The read element (8) is generally formed beneath the lower pole piece (4) which then also serves as an upper shield for the read head. The air-bearing surface of the head, at which the read element is positioned, is indicated as (1) and the dimensional direction "x" is also shown. The trailing end, containing the connecting pads (only (10) is shown), is indicated as (14). FIG. 2 is a schematic drawing showing the trailing end surface (14) of the read/write head assembly where it attaches to external wiring (shown as (13) in FIG. 1) along the actuator arm. The dimension "z" on the drawing would be coming out of the plane of the drawing in FIG. 1. FIG. 2 also shows four gold pads (16, 18, 20, 10) which make the electrical connections to the head assembly. Two of the pads (10 & 20) provide the sense current for the read sensor through internal wiring (9), while the remaining pads (18, 16) provide the coil current for the write head through wires (19). These figures will also be discussed below in the context of the description of the preferred embodiment.

Seagle (U.S. Pat. No. 5,936,811) provides a slider assembly similar to that in FIGS. 1 & 2 in which the current carrying leads are disposed in a manner that eliminates the need for vias passing through the insulating layers and shield layers to allow the electrical activation of the read and write sensors.

Chang et al. (U.S. Pat. No. 6,158,107) provide a merged read/write head in which the pole tips of the write head are more advantageously defined by use of a self-alignment formation process and show the use of a substantial overcoat in the head formation.

Maries et al. (U.S. Pat. No. 3,770,403) discloses a magnetic head assembly in which the read/write circuit portions of the assembly are formed on a chip and bonded to head assembly by a glass-ceramic material whose coefficient of expansion matches the coefficient of expansion of the parts to be joined. Another feature of this structure is that the method of mounting the head assembly on the support arm allows the air flow past the assembly to act as a coolant for the circuit chip and also allows the thermal conductivity of the metal structure of the arm to act as a heat sink for the circuit chip.

Phipps et al. (U.S. Pat. No. 5,757,590) deals with the problem of electrostatic charge buildup on read/write heads, which is another problem associated with rapid relative movement between the head and the recording medium. Phipps provides a fusible link element connected across the existing terminal pads of the head to discharge the unwanted buildup.

Wang et al. (U.S. Pat. No. 6,130,863) show the use of a magnetic coil and slider assembly even in the field of magneto-optical storage systems.

Han et al. (U.S. Pat. No. 6,103,136) shows a magnetoresistive read head that typifies those found in the merged read/write heads referred to in the present invention.

None of the prior art cited deals with the significant problem of heat buildup in head elements such as write coils, magnetic pole pieces, overcoat regions and magnetoresistive sensing formations. This heat buildup is not only damaging to the performance of the elements, but differential thermal expansion causes protrusion of elements relative to each other and relative to the air bearing surface, which protrusion can cause damage to the rapidly moving storage medium. It is, therefore, the purpose of the present invention to provide a simple and efficient method whereby the heat dissipation properties of a read/write element can be significantly improved.

SUMMARY OF THE INVENTION

A first object of this invention is to provide a method for forming a magnetic read/write head and slider assembly having improved heat spreading and dissipation characteristics when compared to magnetic read/write heads and slider assemblies of the prior art.

A second object of the present invention is to provide a method for forming such a magnetic read/write head and slider assembly having improved heat spreading and dissipation characteristics, wherein said method of formation is simple and efficient and requires only a slight variation in the present method of forming such a head and slider.

A third object of this invention is to provide a magnetic read/write head and slider assembly having significantly improved heat spreading and dissipation characteristics.

A fourth object of this invention is to provide a read/write head and slider assembly wherein there will be no protrusion of head elements and overcoat relative to the air bearing surface of the head during normal operating conditions.

In accord with the objects of this invention there is provided a magnetic read/write head and slider assembly and a method for forming such a magnetic read/write head and slider assembly, wherein one of the electrically conductive pads that connects the internal current carrying leads of the head to the external circuitry is enlarged and extended over a substantial portion of the bottom of the slider (the trailing end surface) so that it covers and thermally contacts the portion of the overcoat that is above the head structure. Since said pad is typically fabricated of gold or other material that is both electrically and thermally highly conductive, much more thermally conductive than the overcoat material, the enlargement and extension of the pad provides significant additional heat spreading (reduction of sharp temperature gradients) and heat dissipation for the head and slider assembly. Since the external electrical leads connected to the pads offer additional heat dissipation, the effect is magnified and rendered even more advantageous.

BRIEF DESCRIPTION OF THE DRAWINGS

The objects, features and advantages of the present invention are understood within the context of the Description of the Preferred Embodiment, as set forth below. The Description of the Preferred Embodiments is understood within the context of the accompanying figures, wherein.

DESCRIPTION OF THE PREFERRED EMBODIMENT

The preferred embodiment of the present invention provides an efficient and effective method for materially improving the heat dissipation and heat spreading characteristics and eliminating associated thermal protrusion problems of a merged magnetic read/write head and slider assembly by the enlargement of at least one of its current lead connecting pads. The efficacy of this method has been substantiated by simulations that compare heads fabricated according to the method of the invention with heads fabricated according to methods of the prior art.

Referring first to FIG. 1, there is shown a schematic, not-to-scale, cross-sectional diagram of a read/write head and slider assembly typical of the prior art, mounted on an actuator arm assembly at its trailing end surface. For the purposes of description, the cross-sectional plane is the x-y plane as shown in the diagram and the z-axis can be taken as coming out of the plane. The air bearing surface (ABS) of the head is denoted as (1). The head comprises a magnetoresistive read sensor element (8) formed contiguously with the lower magnetic pole piece (4) of an inductive magnetic write element which also serves as an upper shield for the read element. The upper pole piece is of the write element is (6). Between the upper and lower pole pieces can be seen the cross-sections of the energizing coil turns (5) which are encased in a protective medium (12). The read element is shielded below by (3). The pole pieces come together to form a write gap (7). A protective overcoat surrounds the entire formation (2). Typically four internal conductive leads (three not shown) would emerge from the head and terminate at connecting pads (only (10) is shown) on the trailing end surface of the slider assembly, two leads to provide energizing current to the coil and two leads to provide sensing current to the read head. Only one such internal conducting lead is indicated (9) and that lead is shown terminating in a conductive pad (10) that emerges at the trailing end of the head (14). In actuality, there would be four such pads, one attached to each of the internal leads, said pads providing the electrically conducting contact to the external circuitry. The slider assembly connects to the actuating arm (30) along surface (15) to complete the fabrication, with the pads (10) providing the means for connecting the (partially drawn) internal conducting leads (9) to external leads (13).

Figure 3:
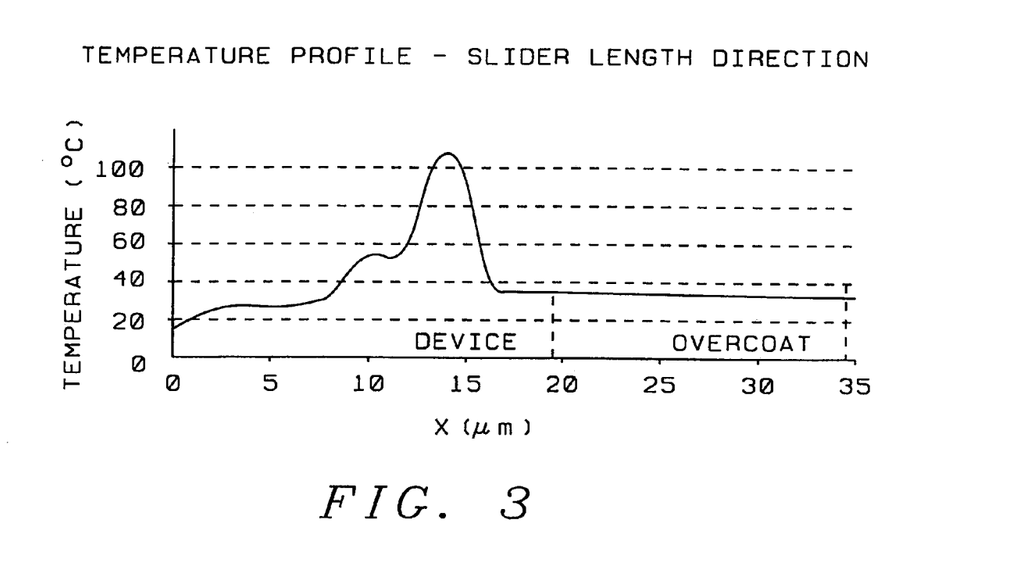
FIGS. 3 and 4 are the graphed results of simulations carried out to show the temperature profile in the x-direction (FIG. 3) and the z-direction (FIG. 4) across a head of the prior art during normal operating conditions.

Referring next to FIG. 2, there is shown a schematic drawing of the surface of the trailing end of the read head, which is shown only as (14) in FIG. 1. The plane of the surface is the z-y plane. The drawing shows the trailing end surface (14) and all four of the conductive pads (10), (18), (16), (20). The pads connect by conducting lines (19), (9) beneath the surface (drawn as dashed lines) to the write coil leads and read element (neither shown) within the head (12), which is also beneath the surface and drawn as dashed. Referring next to FIG. 3, there is shown a graph of temperature (° C.) vs. distance (in microns) in the x-direction or slider length direction (see FIG. 1) resulting from a simulation of a read/write head of the prior art under operating conditions. The x=0 position corresponds to the bottom of the head, x=20 microns locates the top of the head and the region from x=20 microns to x=35 microns encompasses the overcoat. As can be seen from the graph, there is a sharp temperature peak near the overcoat boundary which is a result of the poor heat conduction through the overcoat material.

Figure 4:
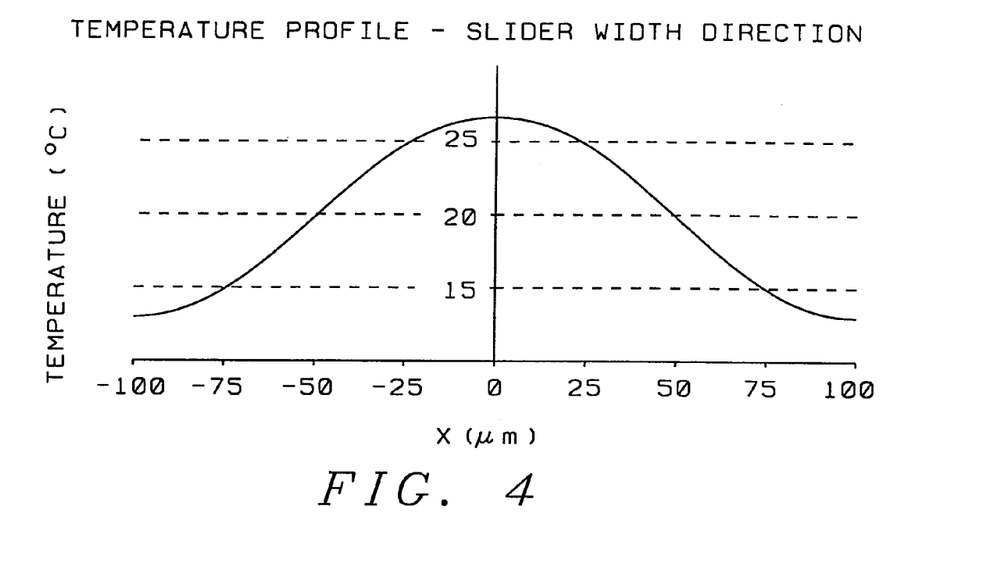

Referring next to FIG. 4, there is shown the temperature distribution of FIG. 3 as measured (by the simulation) in the z-direction (slider width). Once again, the temperature is peaked in the read head region.

Figure 5:
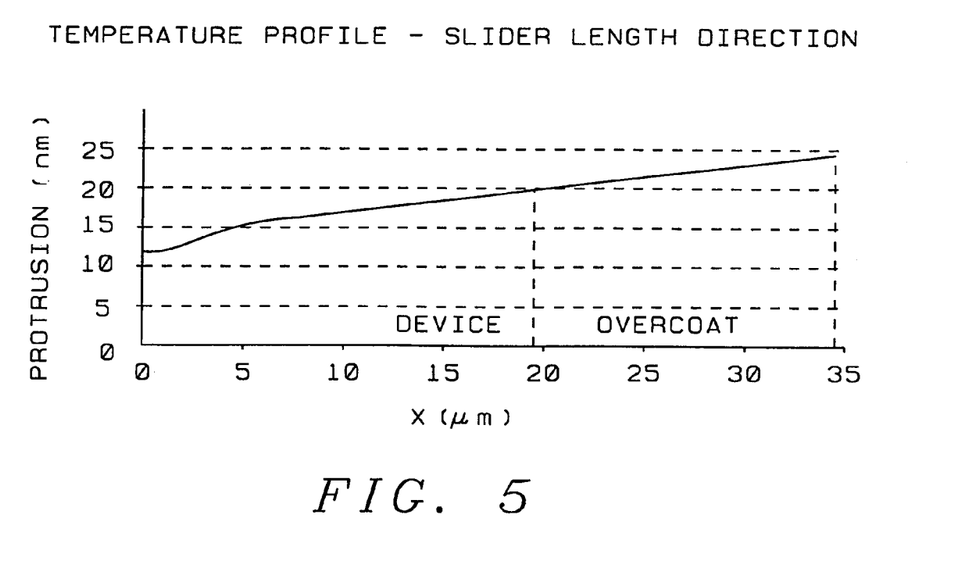
FIGS. 5 and 6 show graphed simulation results of the protrusion profiles of the head and overcoat regions corresponding to the temperature profiles of FIGS. 3 and 4 respectively.
Figure 6:
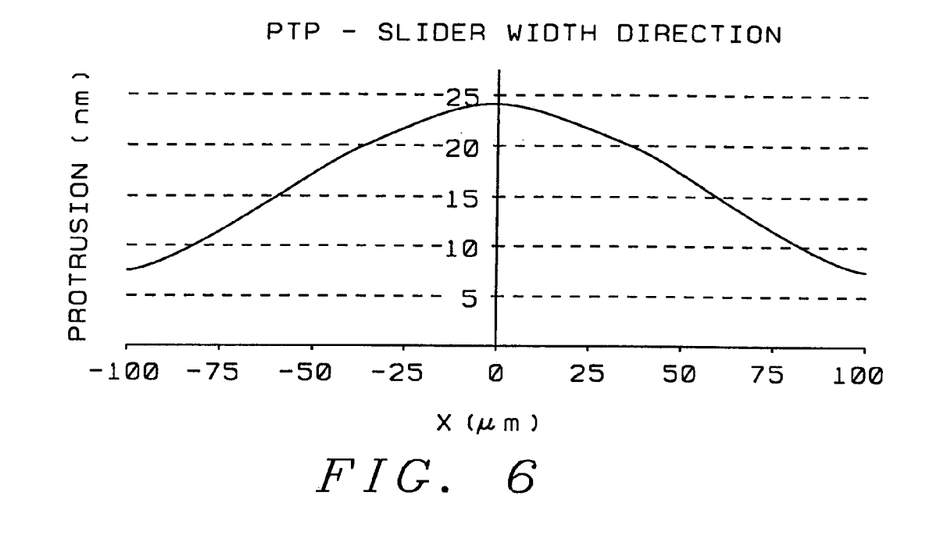

Referring next to FIGS. 5 and 6, there is shown graphical evidence of head and overcoat protrusion (in nanometers) produced by the temperature distributions in FIGS. 3 and 4. In this particular case, the maximum protrusion occurs in the overcoat region.

Figure 7:
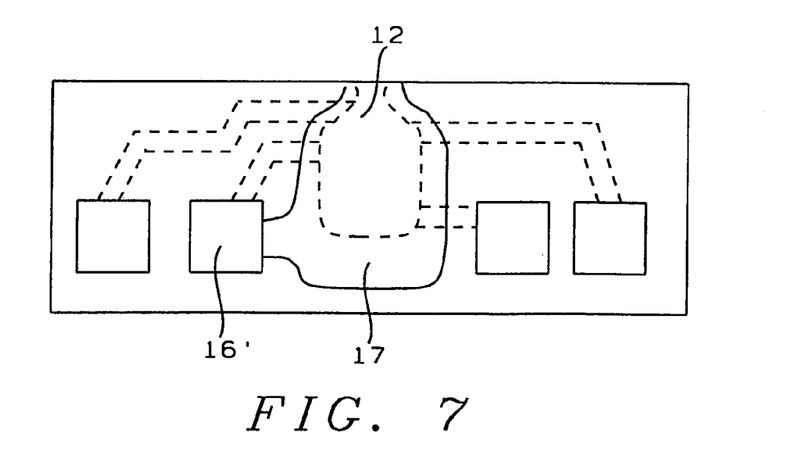
FIG. 7 is analogous to FIG. 2, being a schematic view of the rear surface of a slider/head assembly whose connective pads are formed in accord with the methods of the present invention.

Referring next to FIG. 7, there is shown a schematic drawing of the trailing surface of a slider fabricated according to the method of the present invention. This figure is to be compared to the illustration in FIG. 2, which shows the corresponding surface of a prior art slider. As can be seen in FIG. 7, pad (16'), which corresponds to pad (16) of FIG. 2, has been substantially extended (17) to cover the head region (12) (beneath (17)). Said pad is formed of a metal, such as Au, Ag, Al or Cu, which is both electrically and thermally conductive. In practice, any good heat and electrical conductor that can be efficiently and easily plated on the overcoat material can be used. In the present embodiment, Au is used because it is easily plated on the alumina overcoat and because the remaining conductive pads are also Au. Heat generated within the head region beneath (17) is, therefore, efficiently transferred to the pad extension by conduction, is spread through both the pad and associated external wiring that it is attached to and is dissipated thereby. Given the purpose served by the pad extension, it should be seen that the shape of the extension is not critical, but it should be of sufficient area to completely cover that region of the trailing end surface that is directly over the read head, while not being of so large an area as to interfere with the other connecting pads. In the present embodiment, the Au pad extension, which is plated through a mask, is approximately square in shape and approximately 200 microns by 200 microns in size (area) and approximately between 4 and 5 microns in thickness.

Figure 8:
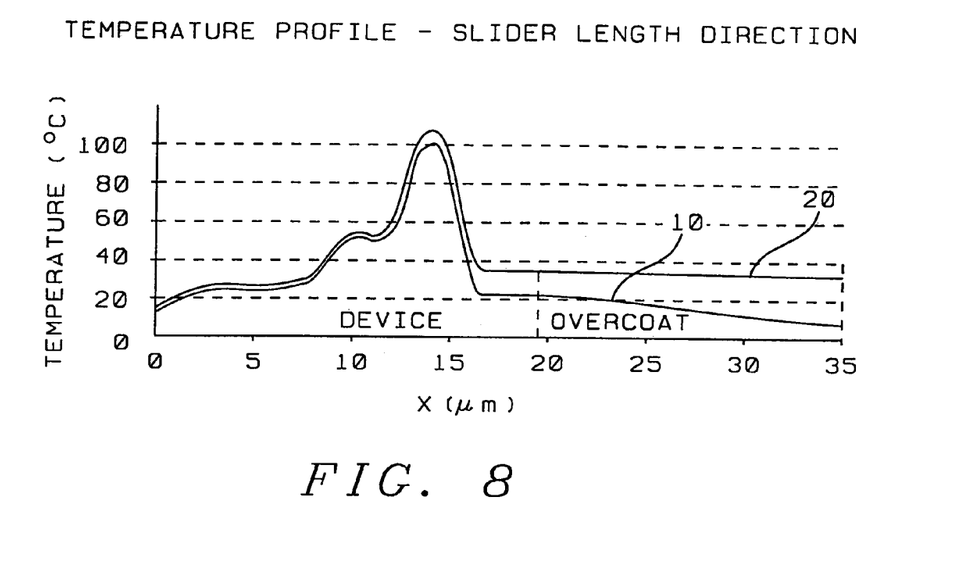
FIGS. 8 and 9 are, respectively, graphical representations of simulated temperature profiles in the slider length direction (x) and the slider width direction (z) for a slider fabricated in accord with the method of the present invention. Each graph also shows the corresponding graphs for a reference slider fabricated in accord with the prior art.
Figure 9:
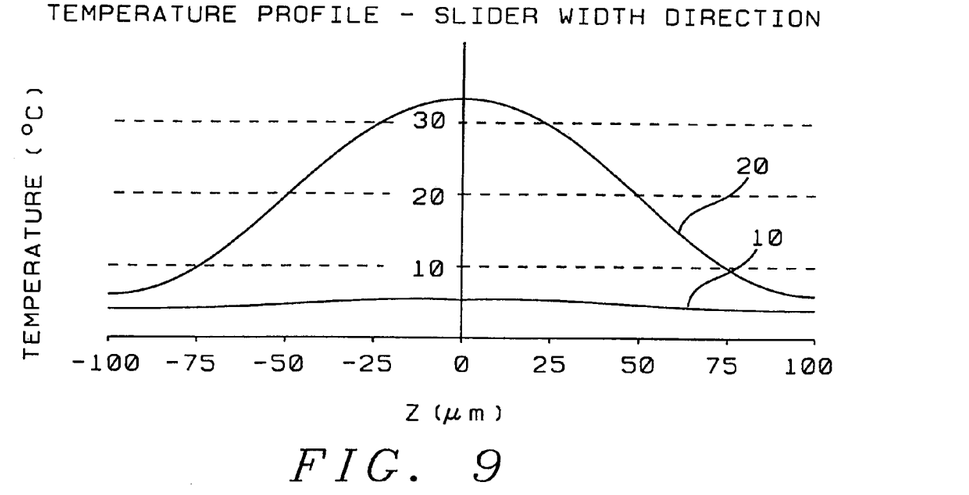

Referring next to FIGS. 8 and 9, there are shown simulated temperature profiles along the x (FIG. 8) and z (FIG. 9) directions for a slider fabricated according to the method of the present invention (10) and for a slider fabricated according to the prior art (20). The prior art slider profiles are the same as those in FIGS. 3 and 4.

Figure 10:
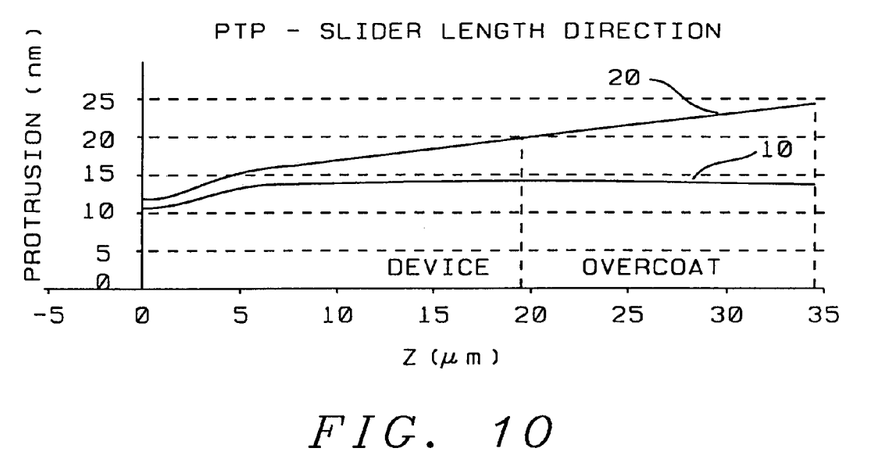
FIGS. 10 and 11 are graphical representations of simulations of the thermal protrusion profiles corresponding, respectively, to the temperature profiles of FIGS. 8 and 9.
Figure 11:
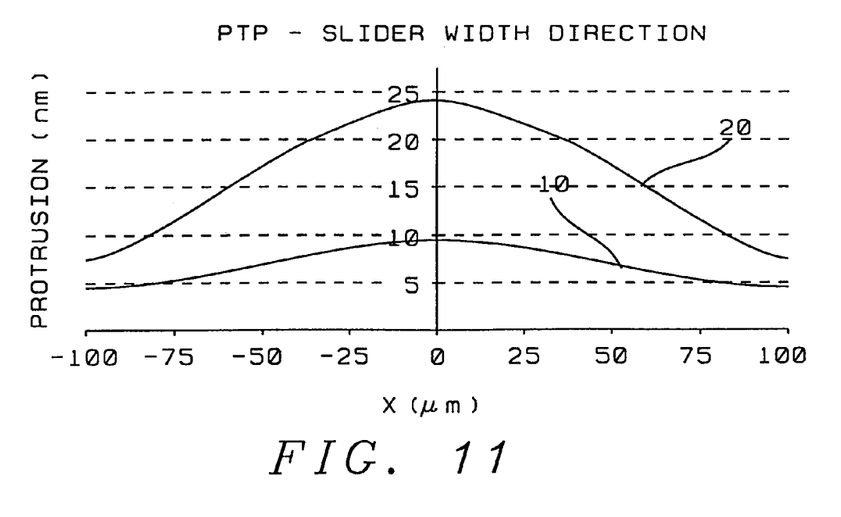

Referring finally to FIGS. 10 and 11, there are shown the protrusion profiles corresponding to the temperature profiles in FIGS. 8 and 9. Once again, (10) indicates the invention and (20) indicates the prior art. The significant reduction in protrusion is readily apparent.

As is understood by a person skilled in the art, the preferred embodiment of the present invention is illustrative of the present invention rather than limiting of the present invention. Revisions and modifications may be made to methods, materials, structures and dimensions employed in the present method of fabricating a magnetic read/write head and slider assembly with improved heat dissipation and thermal protrusion properties, while still providing a read/write head and slider assembly with improved heat dissipation and thermal protrusion properties, in accord with the spirit and scope of the present invention as defined by the appended claims.

What is claimed is:

1. A magnetic read/write head and slider assembly having improved heat spreading and heat dissipation characteristics and reduced thermal protrusion comprising:

a magnetic read/write head and slider assembly on whose trailing end surface are formed a plurality of electrically isolated conducting pads, said pads providing electrical connections between said read/write head and external circuitry by means of internal current leads connected between said pads and said read/write head; and at least one of said conducting pads having a larger surface area, the surface area of said larger pads covering at least that portion of the trailing end surface that is above said read/write head and said pads being in thermal contact with said trailing end surface.

2. The assembly of claim 1 wherein said conducting pads are formed of Au.

3. The assembly of claim 1 wherein said conducting pads are formed of Ag.

4. The assembly of claim 1 wherein said conducting pads are formed of Cu.

5. The assembly of claim 1 wherein said conducting pads are formed of Al.

6. The assembly of claim 1 wherein said conducting pads are formed of electrically and thermally conducting alloys.

7. The assembly of claim 1 wherein the pads are formed with regular geometrical shapes and each of the larger of said pads comprises such a regularly shaped pad with an extension thereon.

8. The assembly of claim 7 wherein said regularly shaped pads are approximately square and are formed to a thickness of between approximately 1 micron and 6 microns and with a side of between approximately 50 microns and 250 microns.

9. The assembly of claim 8 wherein the larger of said pads is between approximately 4 microns and 5 microns in thickness and comprises a square of side between approximately 50 microns and 250 microns and an extension of side between approximately 150 microns and 250 microns and wherein the shape and dimensions of said extension is sufficient to cover an area of the trailing surface that is above the read/write element.

10. The assembly of claim 9 wherein there are four conducting pads, one of which has a larger surface area.

* * * * *

UNITED STATES PATENT AND TRADEMARK OFFICE
CERTIFICATE OF CORRECTION

PATENT NO.         : 7,154,708 B2                                             Page 1 of 1
APPLICATION NO.    : 11/172173
DATED              : December 26, 2006
INVENTOR(S)        : Devendra S. Chhabra et al.

It is certified that error appears in the above-identified patent and that said Letters Patent is hereby corrected as shown below:

In the inventors, (75), delete "Devendra S. Chhabra, San Jose, CA (US); Rod Lee, San Jose, CA (US); Glen Garfunkel, San Jose, CA (US); Mor Dovek, San Jose, CA (US); Cherng-Chyi Han, San Jose, CA (US)" and replace with --Devendra S. Chhabra, San Jose, CA (US); Rod Lee, San Jose, CA (US); Glen Garfunkel, San Jose, CA (US); Moris Dovek, San Jose, CA (US); Cherng-Chyi Han, San Jose, CA (US)--.

Signed and Sealed this

Sixth Day of March, 2007

JON W. DUDAS
*Director of the United States Patent and Trademark Office*